(12) United States Patent
Graf et al.

(10) Patent No.: US 12,429,863 B2
(45) Date of Patent: Sep. 30, 2025

(54) DIAGNOSTIC METHOD FOR LOCALIZING TECHNICAL FAULTS IN A MOTION SYSTEM

(71) Applicant: ETEL S.A., Môtiers (CH)

(72) Inventors: Basile Renaud Graf, Neuchâtel (CH); Ralph Coleman, Fleurier (CH)

(73) Assignee: ETEL S.A., Môtiers (CH)

( * ) Notice: Subject to any disclaimer, the term of this patent is extended or adjusted under 35 U.S.C. 154(b) by 107 days.

(21) Appl. No.: 18/596,859

(22) Filed: Mar. 6, 2024

(65) Prior Publication Data
US 2024/0310823 A1  Sep. 19, 2024

(30) Foreign Application Priority Data
Mar. 16, 2023  (EP) .................................. 23162394

(51) Int. Cl.
*G05B 23/02* (2006.01)
*G01B 11/00* (2006.01)

(52) U.S. Cl.
CPC ........ *G05B 23/0262* (2013.01); *G01B 11/002* (2013.01); *G05B 23/0221* (2013.01); *G05B 2219/24065* (2013.01)

(58) Field of Classification Search
CPC ............ G05B 23/0262; G05B 23/0221; G05B 2219/24065; G05B 23/0218; G01B 11/002; F16F 15/002; F16F 2230/24
See application file for complete search history.

(56) References Cited

U.S. PATENT DOCUMENTS 6,021,991 A    2/2000  Mayama
6,022,005 A *  2/2000  Gran et al. .............. F16F 15/02
(Continued)

FOREIGN PATENT DOCUMENTS

| CN | 105539054 A | | 5/2016 | |
|---|---|---|---|---|
| WO | WO2020078141 | * | 4/2019 | ......... G05B 23/0262 |
| WO | WO-2020078141 A1 | * | 4/2020 | ......... G05B 23/0262 |

OTHER PUBLICATIONS

European Search Report issued in EP Patent Application No. 23162394 dated Aug. 30, 2023, pp. 1-2.

*Primary Examiner* — Brodie J Follman
(74) *Attorney, Agent, or Firm* — Carter, DeLuca & Farrell LLP

(57) ABSTRACT

A diagnostic method localizes technical faults in a motion system that includes a base adapted to receive a motion stage for equipment, a machine frame resting on the floor, dampers adapted to support the base, and an active isolation system arranged between the base and the machine frame. The active isolation system and the base form a mechanical system. The active isolation system includes actuators, adapted to impart six degree-of-freedom (DOF) motion to the base in a reference frame, and inertial sensors adapted to provide a six DOF measurement of the base's motion. The method includes: i) applying a control signal for actuating or contributing to the actuation of the actuators of the active isolation system to impart a motion to the base; ii) obtaining, with the inertial sensors, a six DOF measurement of the base's motion relative to a reference point; iii) creating a measured process sensitivity matrix of the mechanical system using the six DOF measurement; and iv) determining, based on the measured process sensitivity matrix, whether all the actuators and sensors of the active isolation system are working as expected and/or whether there is a pivot point impeding the movement of the base.

20 Claims, 4 Drawing Sheets

(56) References Cited

U.S. PATENT DOCUMENTS

| | | |
|---:|---|---|
| 6,196,514 B1 | 3/2001 | Kienholz |
| 2002/0118346 A1 | 8/2002 | Galburt |

* cited by examiner

DIAGNOSTIC METHOD FOR LOCALIZING TECHNICAL FAULTS IN A MOTION SYSTEM

CROSS-REFERENCE TO RELATED APPLICATIONS

The present application claims priority to Application No. 23162394.3, filed in the European Patent Office on Mar. 16, 2023, which is expressly incorporated herein in its entirety by reference thereto.

FIELD OF THE INVENTION

The present invention relates to a diagnostic method for localizing technical faults in a motion system, e.g., an active isolation vibration system of a motion system, e.g., including a motion stage for imparting movements to an equipment, e.g., semiconductor processing equipment. The diagnostic method allows for effective troubleshooting.

BACKGROUND INFORMATION

Precision motion systems, e.g., semiconductor processing equipment, such as positioning devices, coordinate measuring machines, or robots, include so-called active isolation systems, as described, for example, in U.S. Pat. No. 6,021,991, for isolating precision motion systems from ground vibration. Active isolation systems typically include actuators and inertial sensors, which are assembled between a spring mounted granite base onto which a motion stage can be mounted and a machine frame that rests on the floor.

Active isolation systems commonly use feedforward control to compensate for reaction forces generated by the motion stage when operating for imparting movements to equipment, e.g., a semiconductor processing equipment. This compensation scheme uses the stage motions of processing equipment to compute forces and torques to be applied by the actuators to the base to compensate for reaction forces caused by the motion stage and thus avoid unwanted base motions. Active isolation systems therefore ensure the operation of equipment with as little parasitic movement as possible, as a result of which a high positioning or measurement accuracy is obtained.

Despite all the precautionary measures that can be taken, one or more actuators and one or more inertial sensors of the active isolation system may not work as expected. The connection of one or more actuators may be broken or mistakenly inverted during the assembly of the actuators. In this instance, a faulty actuator would provide no force or a force in a direction opposite the expected direction. Similarly, a connection of one or more inertial sensors may break leading to the absence of measurements of one or more degrees-of-freedom of the granite base.

In addition, it may happen that a contact or pivot point impedes the movements of the base. A pivot point may be caused by an unwanted object, for example, a screw, which has inadvertently fallen in the active isolation system of the motion system. This object is usually attracted by the magnet of an actuator, thereby blocking its movements. A contact point can also be created by a bad adjustment of the spring dampers that makes the granite base touch one of its mechanical end stops.

In either instance, although it may become apparent that the active isolation system of the motion system does not behave as it should, it is very difficult to identify the origin of the problem and to locate faulty actuators and sensors or an object impeding the movement of an actuator. Troubleshooting of the motion system is therefore time consuming and tedious as it requires verification of each actuator and inertial sensor of the isolation system for possible failures.

SUMMARY

Example embodiments of the present invention provide a diagnostic method for localizing technical faults in a motion system, e.g., including an active isolation system to actuate the base.

Example embodiments of the present invention provide a diagnostic method for identifying one or more actuators and/or one or more inertial sensors of the active isolation system that do not perform as expected.

Example embodiments of the present invention provide a diagnostic method for localizing one or more contact points within a region of the active isolation system that impede the movements of the base.

Example embodiments of the present invention provide a non-transitory, computer-readable medium having stored therein instructions that, when executed by a processor, cause the processor to perform the diagnostic method.

Example embodiments of the present invention provide a diagnostic method for localizing technical faults in a motion system that includes a base adapted to receive a motion stage for equipment, a machine frame resting on the floor, dampers that support the base, and an active isolation system between the base and the machine frame. The active isolation system forms with the base a mechanical system. The active isolation system includes actuators adapted to impart six degree-of-freedom (DOF) motion to the base in a reference frame and inertial sensors adapted to provide a six DOF measurement of the base's motion. The method includes, for example: i) applying a control signal for actuating or contributing to the actuation of the actuators of the active isolation system to impart a motion to the base; ii) obtaining with the inertial sensors a six DOF measurement of the base's motion relative to a reference point; iii) creating a measured process sensitivity matrix of the mechanical system using the six DOF measurement; and iv) determining, based on the measured process sensitivity matrix, whether all the actuators and sensors of the active isolation system are working as expected and/or whether there is a pivot point impeding the movement of the base.

According to example embodiments, one or more of faulty actuators and/or one or more faulty sensors is/are identified based on the measured process sensitivity matrix for troubleshooting.

According to example embodiments, a control signal is applied as a disturbance on each of the six DOFs to actuate the corresponding actuators to move the base. The corresponding sensors measure the motion of the base in all of the six DOFs to create the measured process sensitivity matrix.

According to example embodiments, the control signals are applied as a disturbance on each of the six DOFs sequentially for actuating the corresponding actuators to move the base. The corresponding sensors measure for each sequential control signal the motion of the base in all of the six DOFs to create the measured process sensitivity matrix.

According to example embodiments, the control signals are applied simultaneously as a disturbance on each of the six DOFs to create the measured process sensitivity matrix. The control signals are of different frequencies to discriminate them from each other.

According to example embodiments, the motion system further includes a closed loop control system having a PID controller for each of the six DOFs, an actuator force calculator for computing a force reference of each actuator based on the corresponding PID controller's output, and a sensor displacement calculator for computing a displacement value in each of the six DOFs based on each inertial sensor's output. The displacement value is subtracted from the desired motion value relative to the reference point and fed to the corresponding PID controller to create a damping effect.

According to example embodiments, in case of a faulty actuator or sensor, the gains of the PID controllers of the active isolation system are reduced to stabilize the active isolation system.

According to example embodiments, the diagnostic method further includes executing a least square algorithm based on the composite sinusoidal motion retrieved from at least one column of the measured process sensitivity matrix to determine the location of an unwanted pivot point in the active isolation system impeding or stopping the motion of the base.

According to example embodiments, the diagnostic method further includes: i) generating a dynamic model of the motion system based on the dimensions of the base and of the dampers and gains of PID controllers of the active isolation system; ii) simulating motion of the base for any possible failure of each actuator and sensor and for any possible combination of two or more faulty actuators and sensors when one or more of control signals are virtually applied as a disturbance on each of the six DOFs; iii) creating and storing a library of virtual process sensitivity matrices of the active isolation system for each possible failure; iv) comparing the virtual process sensitivity matrices with the measured process sensitivity matrix; and v) determining one or more faulty actuators and/or one or more faulty sensors based on the comparison.

According to example embodiments, a neural network is used to identify one or more faulty actuators and sensors based on the comparison. The neural network is trained using the library of virtual process sensitivity matrices.

Example embodiments of the present invention provide a non-transitory, computer-readable storage medium having stored thereon instructions that, when executed by a processor controlling a motion system, cause the processor to make the motion system perform the steps of the method described herein.

Further features and aspects of example embodiments of the present invention are described in more detail below with reference to the appended schematic Figures.

DETAILED DESCRIPTION

Figure 1:
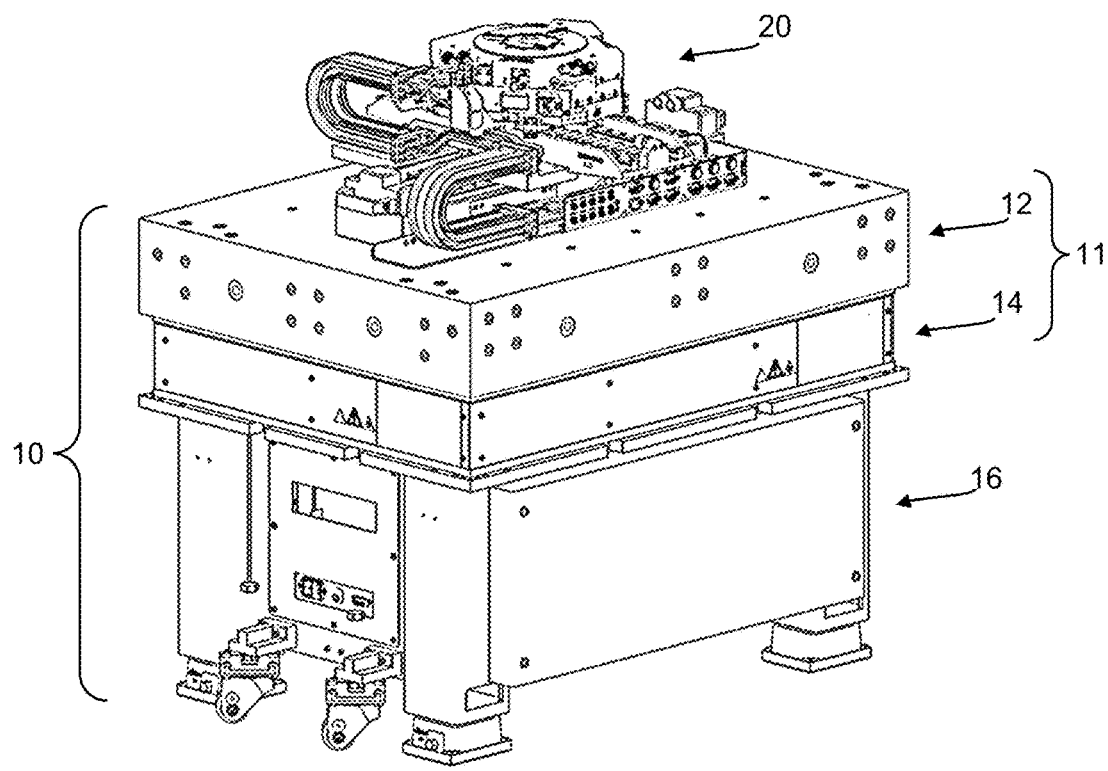
FIG. 1 is a perspective view of a motion system that includes a granite base onto which is mounted a motion stage, a machine frame resting on the floor, and an active isolation system therebetween.

Referring to FIG. 1, a motion system 10 includes a mounting base 12, e.g., a granite mounting base, upon which is fixed a motion stage 20 for equipment, a machine frame 16 resting on the floor, and an active isolation system 14 mounted between the base 12 and the machine frame 16. The base 12 and the active isolation system 14 together form a mechanical system 11. The motion stage 20 is, for example, used for imparting movement to semiconductor processing equipment.

The active isolation system 14 includes actuators $M_{X1}$, $M_{X2}$, $M_{Y1}$, $M_{Y2}$, $M_{Z1}$, $M_{Z2}$, $M_{Z3}$, $M_{Z4}$, inertial sensors $S_{X1}$, $S_{Y1}$, $S_{Y2}$, $S_{Z1}$, $S_{Z2}$, $S_{Z3}$, and feedforward elements to compute forces and torques to be applied by the actuators to the base 12 as a function of the known motions of the motion stage 20 about to occur to compensate for reaction forces and thus avoid unwanted motions of the base 12.

Figure 2:
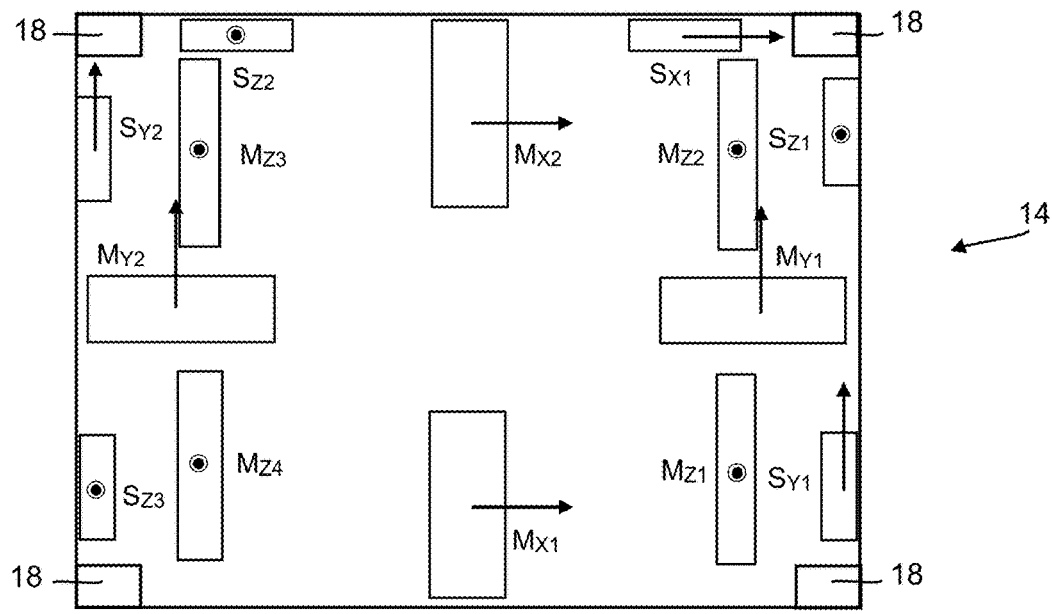
FIG. 2 illustrates the actuators and inertial sensors of the active isolation system illustrated in FIG. 1 configured to provide a six degrees-of-freedom (DOF) actuation to the granite base of the motion system.

Referring to FIG. 2, the active isolation system 14 may include, for example, two actuators $M_{X1}$, $M_{X2}$ adapted to actuate the base 12 in two opposite directions along the X-axis, two actuators $M_{Y1}$, $M_{Y2}$ adapted to actuate the base 12 in two opposite directions along the Y-axis, and four actuators $M_{Z1}$, $M_{Z2}$, $M_{Z3}$, $M_{Z4}$ adapted to actuate the base in the Z-axis. These actuators are selectively actuated to impart a movement to the base 12 in six degrees-of-freedom (DOFs), i.e., the three translational DOFs X, Y, Z and the three rotational DOFs RX, RY, Rz corresponding to rotations around the X, Y, Z coordinate axis.

The active isolation system 14 may include for example six different inertial sensors $S_{X1}$, $S_{Y1}$, $S_{Y2}$, $S_{Z1}$, $S_{Z2}$, $S_{Z3}$ adapted to measure a displacement of the base 12 in each of the six DOFs. The first sensor $S_{X1}$ is adapted to measure the translation motions of the base in the X direction, the second and third sensors $S_{Y1}$, $S_{Y2}$ are adapted to measure the translation motions of the base in the Y direction and the remaining three sensors $S_{Z1}$, $S_{Z2}$, $S_{Z3}$ are adapted to measure motions in the vertical Z direction. The first three sensors $S_{X1}$, $S_{Y1}$, $S_{Y2}$ are, for example, used to measure the in-plane DOFs X, Y, Rz while the remaining three sensors $S_{Z1}$, $S_{Z2}$, $S_{Z3}$ are, for example, used measure the out-of-plane DOFs Z, RX, RY.

Other configurations and combinations of the number and the position of the actuators and inertial sensors to actuate and measure the position of the base 12 in the six DOFs may be implemented depending, for example, on the size of the base 12.

For example, the motion system 10 includes a closed loop system adapted to dampen the movements of the base 12. The active isolation system 14 includes dampers 18, which are, for example, mounted on the four corners of the base 12. These dampers include steel blade springs, steel leaf springs, and/or steel coil springs that have a very low relative damping coefficient and require the closed loop system to dampen the movements of the base. For example, the motion system 10 includes an open loop control system with no position feedback of the moving base. An open loop motion system has dampers including an elastomer material having a high relative damping coefficient instead of the steel springs to dampen the movement of the base.

The active isolation system 14 of the motion system 10 may include one or more faulty actuators and sensors. A faulty actuator may provide no force because of a bad electrical connection or provide a force opposite the intended direction due to an inverted electrical connection. A faulty sensor usually does not provide any measurement, which will cause the actuator force calculator 24 to calculate an incorrect force reference for the actuators, thereby moving the base 12 differently than what is expected.

A diagnostic method adapted for identifying any faulty actuator and any faulty inertial sensor of the active isolation system 14 is described herein. The method includes applying a control signal Fsx, Fsy, Fsz, Fsrx, Fsry, Fsrz for actuating or contributing to the actuation of the corresponding actuators $M_{X1}$, $M_{X2}$, $M_{Y1}$, $M_{Y2}$, $M_{Z1}$, $M_{Z2}$, $M_{Z3}$, $M_{Z4}$ of the active isolation system 14 to impart a motion to the base 12 in all six DOFs. In an open loop motion system, the control signals are used to directly control the corresponding actuators. In a closed loop motion system, the control signals are applied as a disturbance on each of the six DOFs and contribute to the actuation of each actuator $M_{X1}$, $M_{X2}$, $M_{Y1}$, $M_{Y2}$, $M_{Z1}$, $M_{Z2}$, $M_{Z3}$, $M_{Z4}$ of the active isolation system 14 to impart a motion to the base 12.

Figure 3:
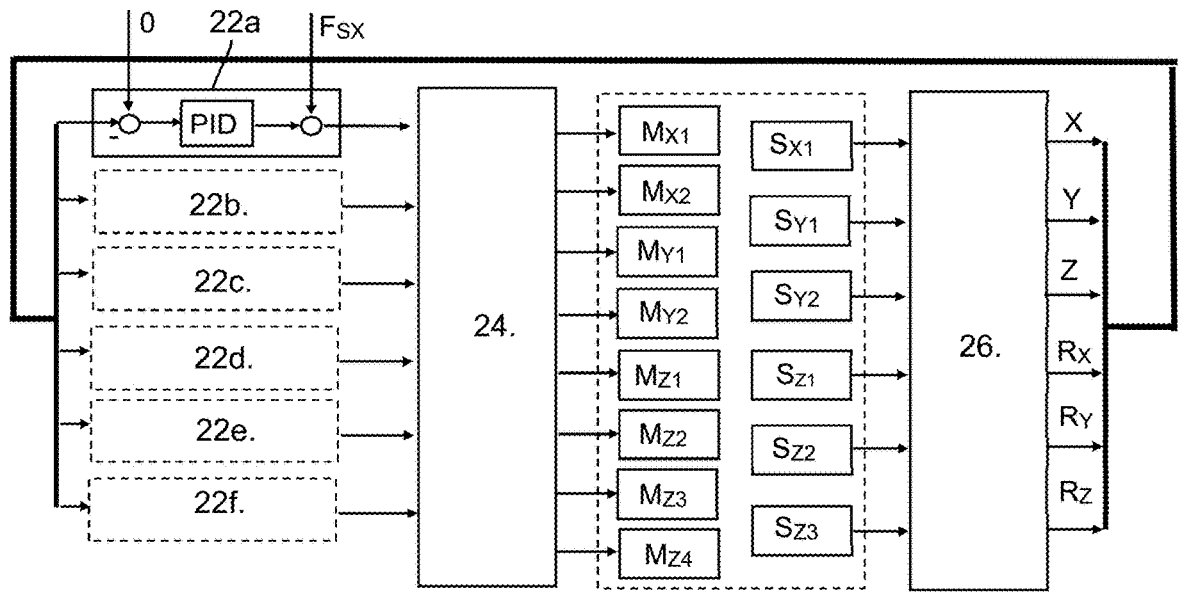
FIG. 3 is a block diagram of a control system of the active isolation system illustrated in FIG. 1.

More particularly, with reference to FIG. 3, the active isolation system 14 includes a PID controller 22a, 22b, 22c, 22d, 22e, 22f for each DOF, an actuator force calculator 24 for computing the amplitude of the force to be applied by each actuator $M_{X1}$, $M_{X2}$, $M_{Y1}$, $M_{Y2}$, $M_{Z1}$, $M_{Z2}$, $M_{Z3}$, and a sensor displacement calculator 26 for computing a displacement value representative of the displacement of the base 12 in each of the six DOFs based on the outputs of sensors $S_{X1}$, $S_{Y1}$, $S_{Y2}$, $S_{Z1}$, $S_{Z2}$, $S_{Z3}$. The displacement acquired in each of the six DOFs is subtracted from a reference, which is zero as the active vibration isolation system 14 seeks to control the actuators to limit as much as possible the parasitic movements of the base 12. The difference is passed through the corresponding PID controller, in which, for example, the derivative D is non-zero to create a damping effect. The control signals Fsx, Fsy, Fsz, Fsrx, Fsry, Fsrz are applied at the output of each PID controller 22a, 22b, 22c, 22d, 22e, 22f to create a disturbance on the control loop.

The control signal may be, for example, a sinusoidal curve of a given frequency, which is, for example, the same for each of the six control signals and is selected within a frequency range, which, for example, does not require too much force to create a movement of the base 12 and which is measured accurately and without phase shift by the inertial sensors. For example, the frequency is selected in the range between 0.5 Hz and 10 Hz, e.g., 2 Hz. The amplitude of these control signals is chosen to create a displacement of the base 12 well within its mechanical end stops, for example, of displacement of 100 μm with a force in the range of 1 to 100 N depending on the mass of the base.

After a stabilization period to remove all transient movements of the base, displacements in all six DOFs are measured for a certain amount of time. For example, when a control signal is applied to a new DOF, it causes movements of the base that contain many frequencies, even if the control signal is sinusoidal. But these parasitic movements are rapidly dampened, and, at the end of the stabilization period, only the one or more frequencies contained in the control signal remain in the base movements.

The inertial sensors $S_{X1}$, $S_{Y1}$, $S_{Y2}$, $S_{Z1}$, $S_{Z2}$, $S_{Z3}$ measure the motion of the base 12 in all of the six DOFs for each control signal. Signal processing is performed on each measurement to retrieve the amplitude and phase of the fundamental frequency of the displacement measurements. This can be performed by Fourier analysis of the measured motion in each of the six DOFs. The amplitude and phase can be expressed as a single complex value. This value is divided by the amplitude of the applied control signal.

In the diagnostic method, a process sensitivity matrix PS of the mechanical system 11 that includes the base 12 and the active isolation system 14 is used. A process sensitivity matrix of a multi-input multi-output (MIMO) mechanical system is conventional. The process sensitivity matrix PS of the mechanical system 11 is a matrix providing the amplitudes of movements of the base 12 relative to the machine frame 16 in all DOFs when the control signals Fsx, Fsy, Fsz, Fsrx, Fsry, Fsrz are applied as disturbances on each of the six DOFs contributing to the actuation of the corresponding actuators $M_{X1}$, $M_{X2}$, $M_{Y1}$, $M_{Y2}$, $M_{Z1}$, $M_{Z2}$, $M_{Z3}$, $M_{Z4}$ to impart a displacement to the base 12.

Figure 4:
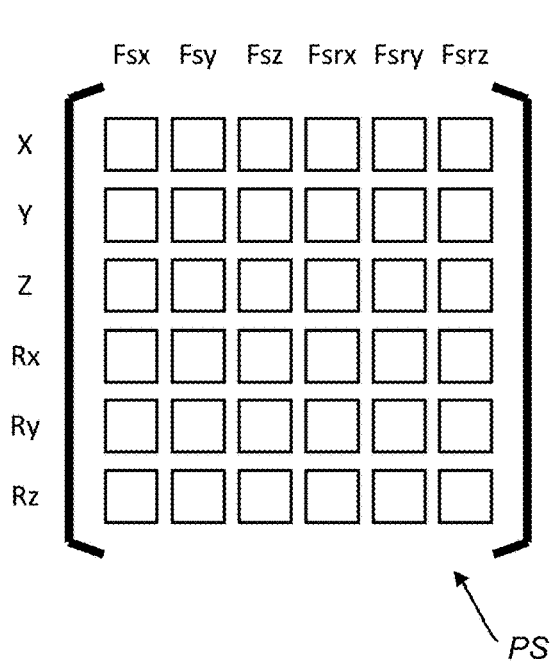
FIG. 4 illustrates a 6×6 complex matrix for in-plane DOFs X, Y, and Rz and out-of-plane DOFs Z, Rx, and Ry, in which each column and row correspond respectively to a controller and to an output of the sensor transform of the control system illustrated in FIG. 3.
Figure 5:
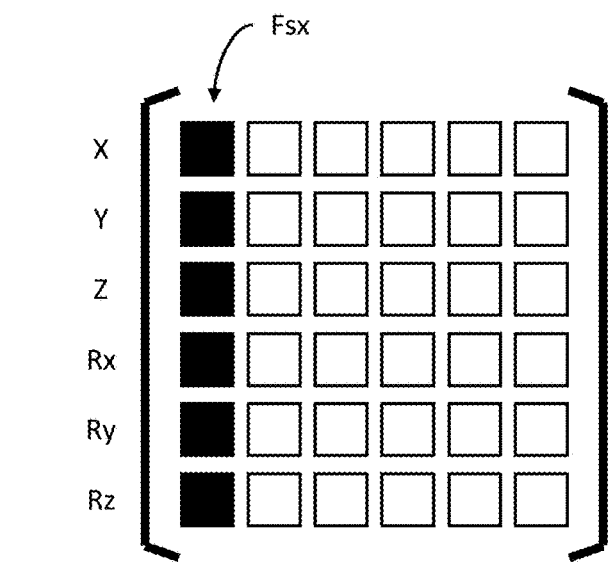
FIG. 5 illustrates the matrix illustrated in FIG. 4, in which a control signal Fsx is applied as a disturbance on the X DOF to populate the first column of the matrix.

A measured process sensitivity matrix PS as illustrated in FIGS. 4 and 5 is created by storing in each column of the matrix the displacement values of the base 12 in each of the six DOFs for the respective six control signals Fsx, Fsy, Fsz, Fsrx, Fsry, Fsrz. A 6×6 complex matrix is thus obtained with the value of the displacement of the base in the six DOFs for each of the six control signals Fsx, Fsy, Fsz, Fsrx, Fsry, Fsrz.

Each column of the measured process sensitivity matrix PS corresponds to the motion of the base in each of the DOFs for a given control signal. For example, the first column of the process sensitivity matrix corresponds to the displacements in the X, Y, Z, Rx, Ry and Rz DOFs of the base 12 caused in part by the control signal Fsx contributing to the actuation of the two actuators $M_{X1}$, $M_{X2}$ to impart a translational movement to the base 12 along the X-direction. The second column corresponds to the displacements of the base 12 caused in part by the control signal Fsy contributing to the actuation of the two actuators $M_{Y1}$, $M_{Y2}$ to impart a translational movement to the base 12 along the X-direction, etc.

The control signals Fsx, Fsy, Fsz, Fsrx, Fsry, Fsrz are, for example, applied sequentially to measure for each control signal the displacement of the base 12 in all of the six DOFs by the inertial sensors $S_{X1}$, $S_{Y1}$, $S_{Y2}$, $S_{Z1}$, $S_{Z2}$, $S_{Z3}$ as explained above.

Alternatively, control signals Fsx, Fsy, Fsz, Fsrx, Fsry, Fsrz of different frequencies may be applied simultaneously. The inertial sensors $S_{X1}$, $S_{Y1}$, $S_{Y2}$, $S_{Z1}$, $S_{Z2}$, $S_{Z3}$ can measure the base's motion so as to create the process sensitivity matrix PS. In this instance, the control signal is a sum of one or more sinusoidal curves with different frequencies for each DOF. This allows for discrimination of the displacement of the base in each DOF since all control signals are applied simultaneously.

Figure 6:
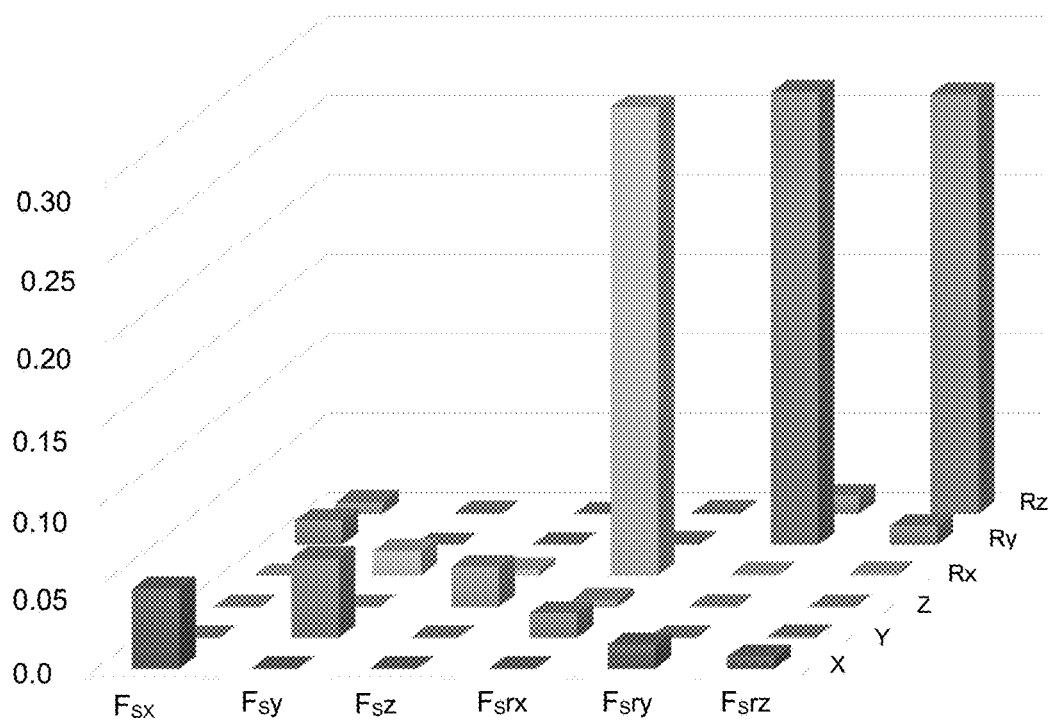
FIG. 6 illustrates the amplitude for each element of the matrix illustrated FIG. 5 for an active isolation system, in which all inertial sensors and actuators are working as intended.
Figure 7:
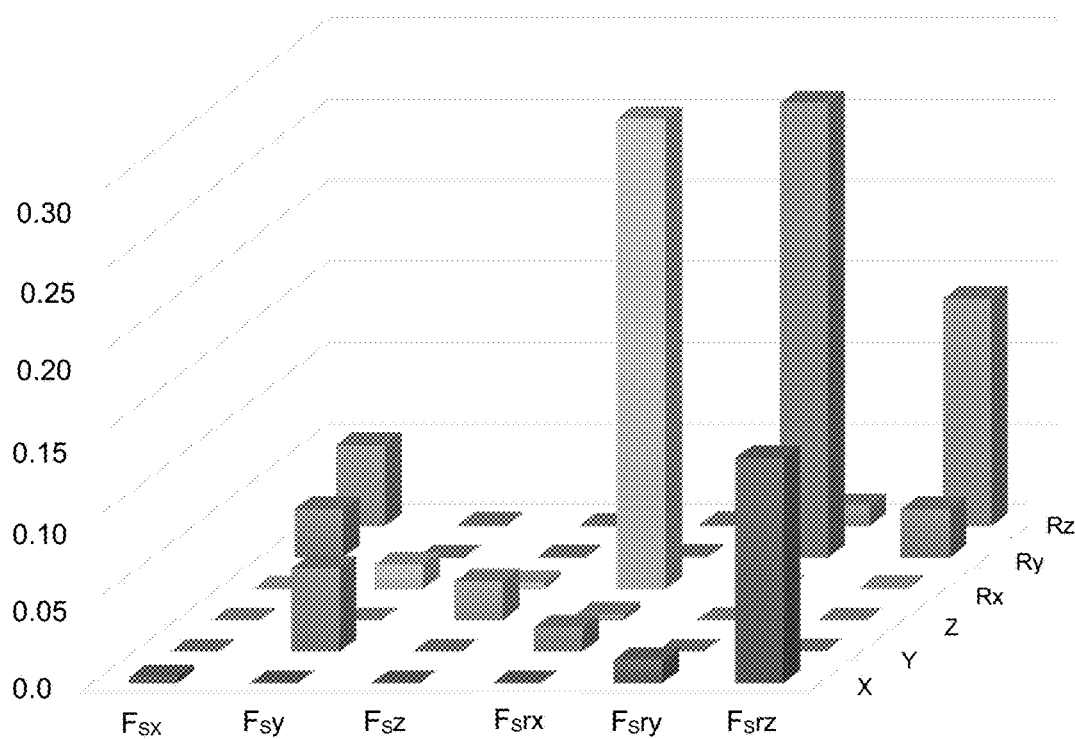
FIG. 7 illustrates the amplitude for each element of the matrix illustrated in FIG. 5 for an active isolation system, in which the connection of the actuator $M_{X1}$ illustrated in FIG. 2 is inverted.

The diagnostic method determines whether all the actuators and the sensors of the active isolation system are working as expected based on the measured process sensitivity matrix PS, as illustrated in FIGS. 6 and 7, which can be displayed on a screen by a computer program for allowing the operator to quickly identify faulty actuators and faulty inertial sensors for effective troubleshooting.

For example, FIG. 6 illustrates the amplitude for each coordinate of the matrix of FIG. 5 for an active isolation system, in which all inertial sensors and actuators are working as intended. In this instance, only the amplitude is represented, but the matrix also contains phase information, which may be necessary in the failure diagnostic and comparison with the virtual process sensitivity matrices. The amplitude of the movements of the base 12 are mainly located on the diagonal because the largest movements are obtained in the direction in which the disturbance is applied. However, off-diagonal values are also present. If, for example, actuator $M_{X1}$ is providing a force in the opposite direction than expected, the two actuators aligned with the X-axis will create a strong torque around the vertical Z-axis instead of creating a combined force along the X-axis with negligeable torque. This will result in the process sensitivity matrix possessing an off-diagonal value in the Rz row of the first column corresponding to Fsx.

FIG. 7 illustrates the amplitude for each coordinate of the matrix illustrated in FIG. 5 for an active isolation system that includes a faulty actuator. It is apparent that the displacement in the X direction is very small when the control signal Fsx is applied to the two actuators $M_{X1}$, $M_{X2}$. It also apparent that rotational movement Rz of the base around the Z-axis is substantially higher than it should be. This measured process sensitivity matrix PS allows the operator to quickly identify that the connection of the actuator $M_{X1}$ is mistakenly inverted, for effective troubleshooting.

Methods based on linear algebra can be used to establish from the matrix whether all sensors and actuators are working correctly or not. For example, a large 2-norm condition number of the matrix, i.e., the ratio of the largest singular value of the matrix to the smallest, with respect to inversion, indicates that the matrix is nearly singular and that at least one sensor or actuator is not working correctly, or that an object is limiting the base's motion. For example, if the matrix condition number exceeds 100, it could be an indication that the matrix is ill-conditioned due to a faulty sensor or actuator, or that an object is limiting the base's motion.

For example, the diagnostic method further includes generating a simulation and/or mathematical modeling of the mechanical system 11 based, for example, on the dimensions of the base 12, the physical properties of the dampers 18, such as mechanical stiffness and relative damping coefficients, and gains of PID controllers of the active isolation system 14.

The resulting process sensitivity matrix can also be a 6×6 matrix with complex entries representing the amplitudes and phases of the displacement in each DOF that are computed through simulation and/or mathematical modeling. More particularly, the motion of the base 12 is simulated when one or more of the control signals Fsx, Fsy, Fsz, Fsrx, Fsry, Fsrz are virtually applied as disturbance to each of the six DOFs and the response of base's motions when any possible failure is simulated for each actuator and sensor and for any possible combination of two or more of the actuators and sensors.

A library of virtual process sensitivity matrices of the active isolation system for each possible failure is created and stored in a memory. This allows for comparison of the measured process sensitivity matrix PS with all the virtual process sensitivity matrices of the library for identifying one or more faulty actuators and/or one or more faulty sensors. A neural network may be used to identify one or more faulty actuators and sensors based on the comparison of the measured process sensitivity matrix PS with the library of virtual process sensitivity matrices, in which the neural network is trained using such library. The comparison can also yield a list of the most probable failures based on the comparison score obtained for each virtual process sensitivity matrix.

The diagnostic method is also adapted for identifying within a region an unwanted pivot point that can be the result of an object getting stuck in the active isolation system 14, e.g., after having been attracted by the actuator magnets, or a bad adjustment of the spring dampers that brings the granite base in contact with one of its mechanical end-stops.

To detect a pivot point, one or more columns of the measured process sensitivity matrix PS are first considered. Each of these columns represents a composite sinusoidal motion of the mechanical system 11. A least-squares problem is provided that allows for the determination as to whether a point located within the active isolation system volume is at standstill or has minimum displacement amplitude based on the measurements obtained for each column of the matrix.

A singular-value based analysis of the least-squares problem is performed to produce a confidence value for the location of a detected standstill point. In the case of two contact points, the system is constrained to rotate around an axis. In such a situation, only the axis-line can be determined, but not the location of the blocking points along this line.

Figure 8:
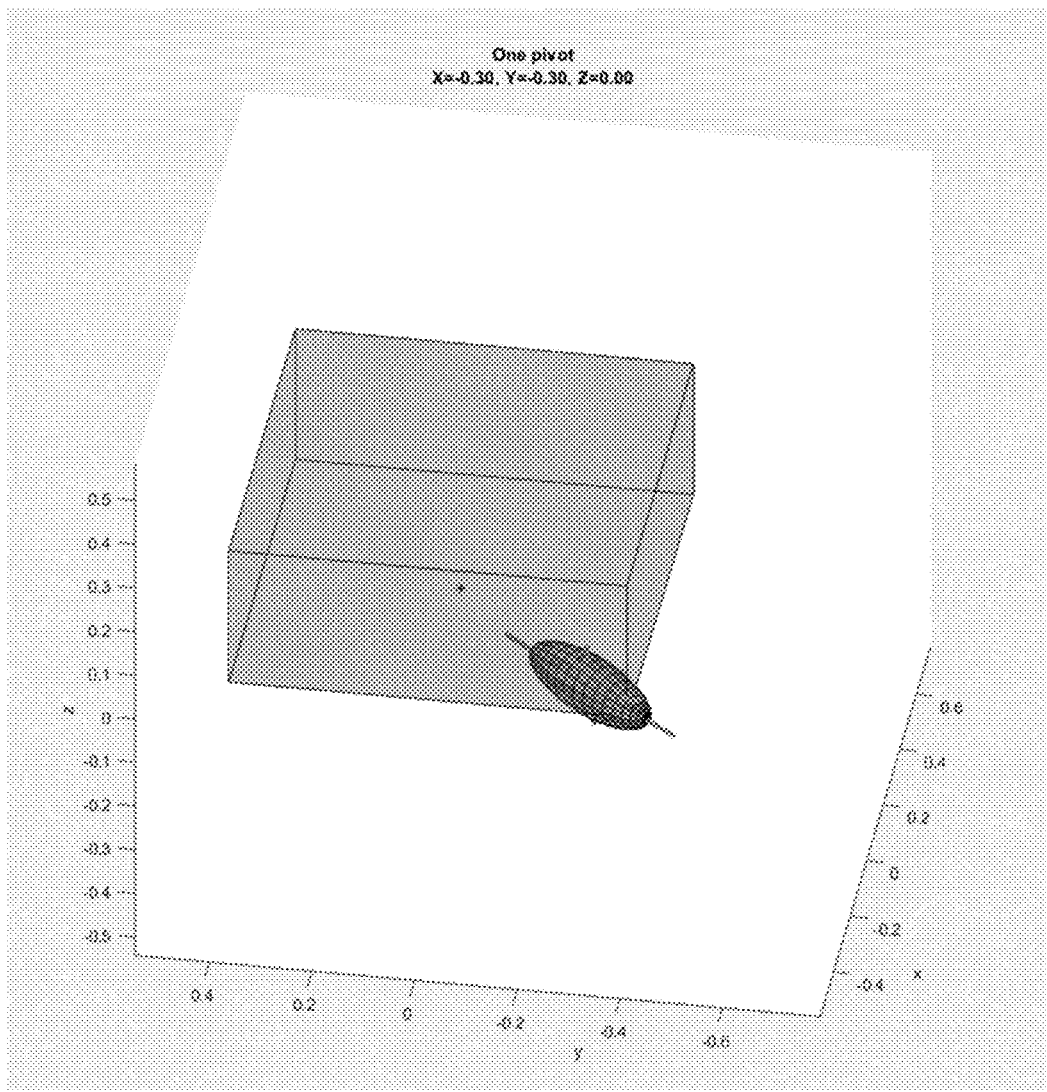
FIG. 8 illustrates a region of the active isolation system inside which a contact point is blocking an actuator.

FIG. 8 illustrates the base represented as a simple parallelepiped, and the location of the pivot with its uncertainty bounds represented as an ellipsoid. This graphic can be displayed on a screen by a computer program so that the operator can search in this region for the contact point and solve the issue. In the case of two pivots, the line containing both contact points is displayed. When the user has located the first pivot, the problem can be solved at this point and the procedure can be repeated so that the computer program can display a more precise location of the second pivot.

What is claimed is:

1. A diagnostic method for localizing technical faults in a motion system that includes a base adapted to receive a motion stage for equipment, a machine frame, dampers adapted to support the base, and an active isolation system arranged between the base and the machine frame, the active isolation system and the base forming a mechanical system, the active isolation system including actuators adapted to impart a six degree-of-freedom motion to the base in a reference frame and inertial sensors adapted to provide a six degree-of-freedom measurement of the motion of the base, comprising:
   applying a control signal to actuate and/or contributing to actuation of the actuators of the active isolation system to impart a motion to the base;
   obtaining, by the inertial sensors, a six degree-of-freedom measurement of the motion of the base relative to a reference point;
   creating a measured process sensitivity matrix of the mechanical system based on the six degree-of-freedom measurement; and
   determining, based on the measured process sensitivity matrix, whether all of the actuators and sensors of the active isolation system are working as expected and/or whether there is a pivot point impeding movement of the base.

2. The method according to claim 1, further comprising identifying, for troubleshooting, at least one faulty actuator based on the process sensitivity matrix.

3. The method according to claim 1, further comprising identifying, for troubleshooting, at least one faulty inertial sensor based on the process sensitivity matrix.

4. The method according to claim 1, further comprising identifying, for troubleshooting, at least one faulty actuator and/or at least one faulty inertial sensor based on the process sensitivity matrix.

5. The method according to claim 1, further comprising applying a control signal as a disturbance in each of the six DOF to actuate the corresponding actuators to move the base, the corresponding sensors measuring the motion of the base in all of the six degrees-of-freedom to create the measured process sensitivity matrix.

6. The method according to claim 5, wherein the control signals are applied as a disturbance on each of the six degrees-of-freedom sequentially for actuating the corresponding actuators to move the base, the corresponding sensors measuring, for each sequential control signal, the motion of the base in all of the six degrees-of-freedom to create the measured process sensitivity matrix.

7. The method according to claim 5, wherein the control signals are applied simultaneously as a disturbance on each of the six degrees-of-freedom to create the measured process sensitivity matrix, the control signals being of different frequencies to discriminate them from each other.

8. The method according to claim 1, wherein the motion system includes a closed loop control system having a PID controller for each of the six degrees-of-freedom, an actuator force calculator adapted to compute a force reference of each actuator based on an output of a corresponding PID controller, and a sensor displacement calculator adapted to compute a displacement value in each of the six degrees-of-freedom based on an output of each inertial sensor output, the displacement value being subtracted from a desired motion value relative to the reference point and being fed to the corresponding PID controller to create a damping effect.

9. The method according to claim 8, wherein in response to a faulty actuator and/or a faulty sensor, gains of the PID controllers are reduced to stabilize the active isolation system.

10. The method according to claim 8, wherein in response to a faulty actuator, gains of the PID controllers are reduced to stabilize the active isolation system.

11. The method according to claim 8, wherein in response to a faulty sensor, gains of the PID controllers are reduced to stabilize the active isolation system.

12. The method according to claim 1, further comprising executing a least square algorithm based on a composite sinusoidal motion retrieved from at least one column of the measured process sensitivity matrix to determine a location of an unwanted pivot point in the active isolation system impeding or stopping the motion of the base.

13. The method according to claim 8, further comprising:
generating a dynamic model of the motion system based on dimensions of the base and of the dampers and gains of PID controllers of the active isolation system;
simulating motion of the base for any possible failure of each actuator and each sensor and for any possible combination of two or more faulty actuators and sensors when at least one control signal is virtually applied as a disturbance on each of the six degrees-of-freedom;
creating and storing a library of virtual process sensitivity matrices of the active isolation system for each possible failure;
comparing the virtual process sensitivity matrices with the measured process sensitivity matrix; and
determining at least one faulty actuator and/or at least one faulty sensors based on the comparison.

14. The method according to claim 13, wherein a neural network is used to identify at least one faulty actuator and/or at least one faulty sensor based on the comparison.

15. The method according to claim 14, wherein the neural network is trained using the library of virtual process sensitivity matrices.

16. The method according to claim 1, wherein the machine frame is adapted to rest on a floor.

17. The method according to claim 1, wherein the machine frame rests on a floor.

18. The method according to claim 1, wherein the equipment includes semiconductor processing equipment.

19. The method according to claim 1, wherein the six degrees-of-freedom include three translational degrees-of-freedom along three orthogonal axes and three rotational degrees-of-freedom around the three orthogonal axes.

20. A non-transitory, computer-readable storage medium having stored thereon instructions, which, when executed by a processor that controls a motion system causes the processor to control the motion system to perform the method recited in claim 1.

* * * * *